Figure 5:
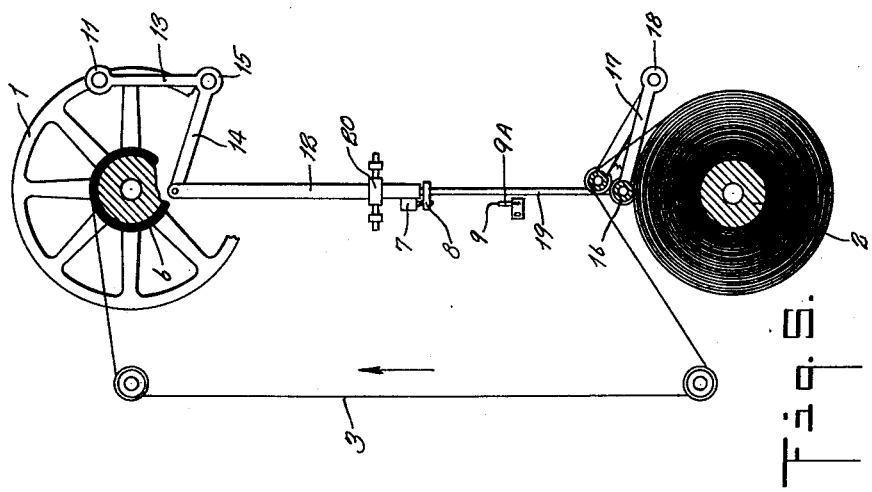

Dec. 1, 1953          P. E. GREENE          2,661,163
AUTOMATIC WIND AND REWIND SYSTEM FOR STRIP MATERIALS
Filed Aug. 25, 1948                         3 Sheets-Sheet 1
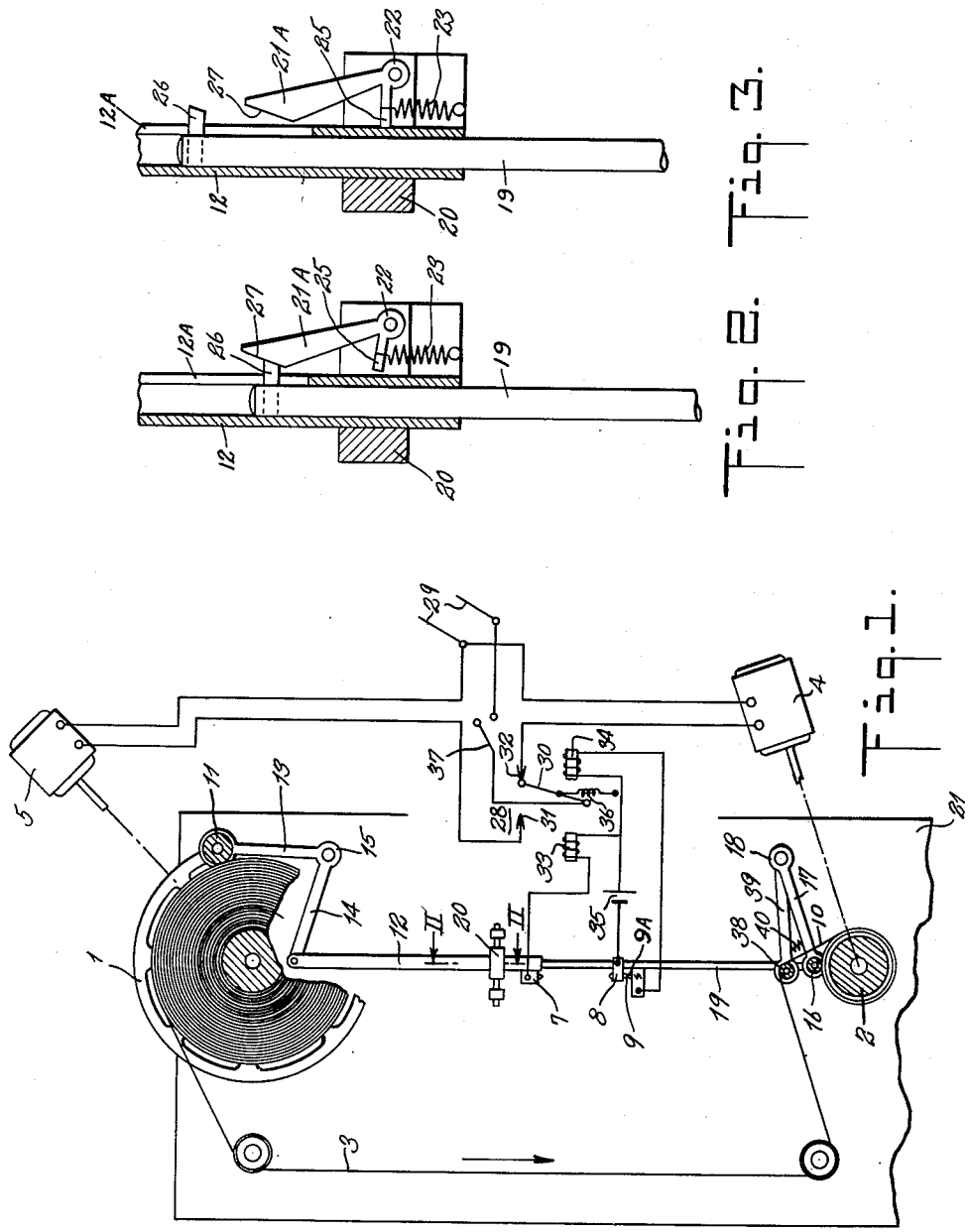
INVENTOR.
PERCY E. GREENE
BY
Kenyon & Kenyon
ATTORNEYS

INVENTOR.
PERCY E. GREENE

Dec. 1, 1953 P. E. GREENE 2,661,163
AUTOMATIC WIND AND REWIND SYSTEM FOR STRIP MATERIALS
Filed Aug. 25, 1948 3 Sheets-Sheet 3

INVENTOR.
PERCY E. GREENE
BY
Kenyon & Kenyon
ATTORNEYS

Patented Dec. 1, 1953

2,661,163

UNITED STATES PATENT OFFICE 2,661,163

AUTOMATIC WIND AND REWIND SYSTEM FOR STRIP MATERIALS

Percy E. Greene, Denville, N. J., assignor to Leventhal Patents, Inc., New York, N. Y., a corporation of Delaware Application August 25, 1948, Serial No. 45,997

10 Claims. (Cl. 242—55)

1

This invention comprises essentially a new and improved mechanism for winding back-and-forth from one drum to another an elongated strip of material such as a motion picture film. It has for its general object the provision of such a mechanism improved by the incorporation therein of one or more of the following features: (a) Improved means for automatically reversing the direction of winding when all the useful portion of the film has been wound through the machine in one direction; (b) improved means for insuring that the unwinding from one drum will automatically cease before a predetermined length of a leader or trailer strip binding the film to the wheel is also unwound from the drum; and particularly (c) means insuring that the wind and rewind mechanisms will automatically adjust themselves to operate in the foregoing manner for any size of film roll, i. e., for any of a number of film rolls of different diameters—the latter means functioning without the necessity of any effort on the part of the operator additional to that normally required for the insertion of the film roll into the mechanism.

While the invention finds application in any sort of a system for winding strip-like material from one end to the other and back again, it finds particularly advantageous application in connection with the winding and unwinding of photographic film for motion picture projection or even for the processing thereof. Rewinding is of course always necessary in the projection of motion picture film; cyclic back-and-forth winding is however especially desirable in what are known as automatically repeating projectors wherein the film, after projection, is automatically rewound and is either projected again immediately and automatically or simply remains in condition for re-projection at the will of the operator. In the normal practice, rolls of such film ordinarily vary in outer diameter from roll to roll and have attached to their opposite ends leader or trailer strips which serve to attach the ends of the projected portion to the drums upon which it is wound. With automatic repetition projection, it is usually desirable that these leader or trailer strips remain attached to the drums at all times and therefore that they not be wound off the drums during the automatic back-and-forth winding of the film.

Among the desiderata of systems of the foregoing character are the following: The mechanism should be so arranged that power will be transferred smoothly and in proper time back-and-forth between the supply drum from which

2 the film is normally unwound during actual projection and the take-up drum onto which it is collected. The timing of power transfer should be such that it will occur immediately at the moment when all of the projectable portions of the film have been unwound or rewound and before either the leader or trailer strips can leave, either in unwinding or rewinding, their associated drums completely (preferably no more than necessary to permit the projectable portion to run through the lens structures). The power transfer control devices should be such that no control device, such as a roller, rests on the actual emulsion surface of the main body of the film although such rollers are permissible when acting on the reverse non-emulsified side of the film as is the case with the film roll on the take-up drum hereinafter described. Lastly, and most importantly to the present invention, it is highly desirable that a drum carrying any normal amount of film may be introduced into the system without the necessity of the operator making adjustments for the length, this being accomplished automatically so that the system will accommodate rolls of film of varying length, that is, varying diameters.

Figure 4:
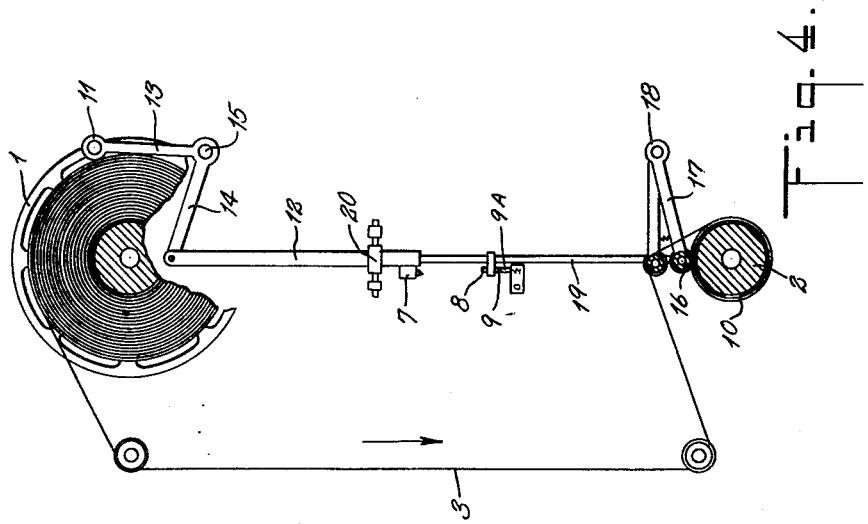
Figure 6:
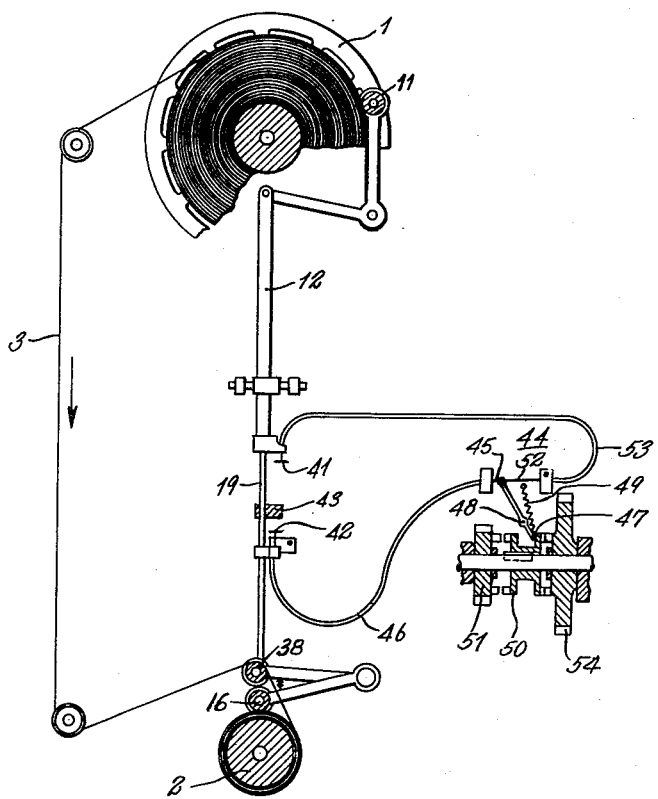

The features believed to constitute the invention in its broadest scope are pointed out in the appended claims. It is believed, however, that the invention itself will best be understood by those skilled in the art by reference to the following specification and the accompanying drawings which illustrate one preferred embodiment thereof. In the drawings: The Fig. 1 represents schematically the wind-and-rewind system of a motion picture projecting machine omitting for the sake of clarity elements not constituting parts of the invention such as the projection lenses, shutter mechanisms etc.; Figs. 2 and 3 are cross sections along dotted line II—II of Fig. 1 in a plane normal to the drawing and constitute detail illustrations of a linkage interlocking arrangement of Fig. 1 shown respectively in its unlocked and locked position; Figs. 4 and 5 are views similar to Fig. 1 showing the system in its extreme opposite positions, Fig. 4 showing the film in its position ready for the commencement of projection; and Fig. 5 showing it in its position ready for the commencement of rewinding; while Fig. 6 represents an alernative embodiment employing mechanical power transfer means in the place of the electrical means of the preceding figures.

Broadly speaking, the heart of the invention resides in the provision of means equivalent to the mechanical interlinkage system between the film supply reel or drum 1 and the film-collecting or take-up reel or drum 2 between which the film 3 is wound back-and-forth. The interlinkage system is so arranged that it will deenergize the motor 4 driving the drum 2 at precisely the time when all of the projectable picture portion of the film has passed through the machine and before the trailer strip 6 (the relatively short length of blank tape securing the trailing end of the film to the drum 1 as best indicated in Fig. 5) has been wound off the drum 1. At that time movable contacts 7 and 8 of the limit switch arrangement comprising contacts 7, 8 and 9 (stationary) associated with the mechanical interlinkage system are brought together (as in Fig. 5) by upward motion of contact 8 and operate to deenergize the motor 4 of drum 2 and energize the driving motor 5 for the drum 1 so that film automatically begins to rewind. Again the linkage system is so arranged that the rewinding will cease at precisely the time when all of the picture portion of the film has been rewound but before the leader strip 10 (another short length of blank tape best indicated in Fig. 4 as securing the leading film end to the drum 2) has been wound off. At this time, the contacts 8 and 9 are brought together (as in Fig. 4) and operate to deenergize motor 5 and energize motor 4 so that projection automatically recommences. This cycle of winding and rewinding may be continued automatically unless stopped by the intervention of the operator or otherwise. For example, it may be stopped manually or automatically after the completion of the rewinding in order that the machine may be left in condition ready for reprojection at the will of an operator. The specific mechanism to accomplish the foregoing mode of operation is as follows:

The roller 11 is adapted to engage the outermost layer of the film on the drum 1. As will be explained in greater detail hereinafter, the roller 11 is locked approximately at a position (radially from the axis of drum 1) corresponding to the maximum extent of the film roll (less leader strip) on the drum 1, thus completely separating it from the emulsion bearing surfaces of all but the very outward film layers. The roller 11 controls the up-and-down movement of a hollow tube 12 in accordance with the maximum amount of film on the drum 1 and, in that respect, the roller may be considered as constituting with the tube 12 a follower system which automatically measures the amount of film introduced. Tube 12 has a longitudinal slot 12A for purposes to be described. The action between the tube 12 and the roller 11 is effected through the medium of the lever system 13 and 14 which is pivoted at a suitable fixed pivot point 15. A similar roller 16 guided by lever 17 pivoted at 18 is arranged to ride on the film on the drum 2 and in this case the roller is permitted to ride directly on the entire lateral dimension of the film inasmuch as the emulsion is now on the underside by virtue of the fact that the film surfaces have been reversed on the drum 2. The roller 16 has attached thereto a rod 19 which extends into the hollow tube 12 and may be considered as constituting with the roller 16 a follower system following the instantaneous position of the last layer of film on the drum 2. In this respect the action of the roller 16 differs from that of the roller 11 in that it continuously follows the diameter of the roll whereas the roller 11 is locked in a position corresponding approximately to the maximum outer extent of the roll.

In order to guide tube 12 and also to permit a certain amount of lateral movement thereof as necessitated by the rotation of the lever systems (13, 14 and 17), any suitable means such as the block 20 may be provided and affixed to a base 21 which constitutes a support for the entire mechanism. Tube 12 may extend through any suitable laterally extending slot in block 29 which slot will have sufficient extent to accommodate any necessary lateral movement of tube 12.

Contacts 7 and 8 are affixed to tube 12 and rod 19 respectively, while contact 9 is affixed to base 21 except to the extent that it is preferably mounted on a spring upwardly biased plunger 9A which permits contact 9 to move slightly downwardly to permit roller 16 to drop all the way to the reel 2 when no leader strip 10 is on it. The extent of movement of plunger 9A may be visualized by comparing Figs. 1 and 4.

As to the functioning of the mechanisms thus far described, it will be apparent that the rod 19 will move up-and-down within tube 12 in accordance with the winding and unwinding of the film on the drum 2. This up-and-down motion of the rod 19 is caused to control the selective energization of the motors 4 and 5, which alternately drive the drums 1 and 2, through the medium of the limit switch arrangement in the following manner: When, during automatic back-and-forth winding, rod 19 reaches its lowermost point of excursion (corresponding as in Fig. 4 to the condition in which drum 2 has only the leader 10 on it), the contact between contacts 8 and 9 which then begins will cause a deenergization of the motor 5 driving the drum 1 and an energization of the motor 4 driving the drum 2. Thereby any rewinding of the film from the drum 2 onto the drum 1 is stopped and the motion reversed to resume projection. Conversely, when the rod 19 together with the contact 8 reaches the uppermost point of its excursion (corresponding to the condition in which drum 1 has only trailer 6 on it, as in Fig. 5) the contact between contacts 7 and 8 will cause deenergization of motor 4 and energization of motor 5 whereby the rewinding process is initiated.

It is particularly to be noted that the fact that the contact 7 moves with the tube 12 causes it to be automatically positioned to accommodate the entire action to different amounts of film on the drum 1. Thus, by virtue of the fact that a larger winding on the drum 1 will raise and lock contact 7 at a higher position, the motor 5 will not be deenergized during the rewinding process until a later time at which the entire amount of the film has been rewound. The converse action with respect to the contact 9 is unnecessary for which reason it is fixed in position except to the extent already indicated.

The action of the automatic accommodation to film roll size of the follower system constituting the roller 11 and the tube 12 includes the locking action of the inter-coupling system between the rod 19 and the hollow tube 12. This is best illustrated by the Figures 2 and 3. It will be seen there that the fixed block 20 has mounted thereon a rotatable dog 21A which is pivoted at 22 and biased counterclockwise by the spring 23 to such a position that it will lock by means of dog arm 25 the tube 12 against vertical movement, as indicated by the Figure 3. Attached to the rod 19 is a pin 26 which slides in a suitable longitudinal slot 12A in the tube 12. When the rod 19 together with the pin 26 is in its lowermost position as indicated by the Figures 1 and 2, the pin 26 will engage the surface 27 of the dog 21A and thereby rotate it clockwise in order to release the dog arm 25 from engagement with the tube 12. Obviously therefore, the tube 12 will be free to move up-and-down in the vertical direction when thus unlocked.

The function of this locking arrangement is as follows. When the operator places a given amount of film on the drum 1, the roller 11 and, thus, tube 12 will drop to a position corresponding to the maximum radial extent of the film winding, that is, the follower system will accommodate itself to the outermost layer of a newly added roll of film on the reel 1. This, as already explained, is by virtue of the lever system the arms 13 and 14 of which are affixed to each other. (Contact 8 will already have engaged contact 9 and depressed plunger 9A.) The pin 26 is so positioned that when the roller 16 is resting on the outermost layer of a predetermined amount of leader strip on drum 2 (or is at any lower position such as when drum 2 is empty) the rod 19 and the pin 26 will hold the locking dog 21A, or rather its arm 25, out of contact with the tube 12; however, as soon as a picture portion begins to pass through the projector, the rod 19 begins to rise with the collection of an additional small amount of leader on the reel 2 over and above the predetermined amount, and the pin 26 will rise correspondingly and release the dog arm 25 which thereupon locks the tube 12 in a fixed position at precisely the time when a predetermined amount of leader 10 has collected on drum 2, or at precisely the time when picture portions start through the projector. The tube 12 will remain thus locked throughout all subsequent wind and rewind cycles and the system will then wind and rewind continuously and yet stop rewinding and reverse at exactly the right moment when all of the picture portion of the film has been rewound but before the leader strip 10 has been wound off drum 2 to more than a predetermined extent determined by the setting of pin 26.

It will be apparent therefore that the interlinkage system automatically adjusts itself to film rolls of different diameters. The action of the pin 26 in releasing the dog 21 just shortly after a predetermined small amount of film or leader has been wound on the drum 2 has the further advantage that it insures that the trailer strip 6 will not run off the reel 1 at the end of the feed cycle because the locking action sets the contact 7 closer to contact 8 by an amount which results in a predetermined number of leader layers on drum 2. It follows that contact 7 will be contacted when an equal number of layers of trailer remain on drum 1. The mechanism will thus adjust itself to allow several wraps of the trailer or the leader to remain on the respective drums on both ends of the film's excursion.

As a convenient way of conforming the action of the follower system associated with the reels 1 and 2 to obtain the foregoing results, I have used drums having hubs of identical dimensions and I have chosen to make the levers 13, 14 and 17 of the same lengths and to place the pivot point 15 in the same relative position with respect to the center of the drum 1 as pivot point 18 is with respect to the center of drum 2. Because of this it will be apparent that in one projection run the roller 16 will climb the same distance away from the hub surface of the drum 2 as the roller 11 was initially set away from the hub surface of drum 1. Therefore, if the initial locked setting of contact 7 be such that it is then separated from contact 8 by a distance just equal to the radial thickness of the film picture portion, the reversals will occur at precisely the ends of the picture portion. It will be understood, of course, that other geometrical arrangements including different dimensions for the respective elements may be devised with the same results. For example, it may be necessary to make allowance for different size drums 1 in practice. In practice, the diameter of drum 2 might be equal to the diameter of the largest standard reel drums 1 and the operator might use different methods of overcoming diameter inequalities. He could, in the case of drums 1 having smaller hub diameters, make up the difference in diameters by adding an appropriate amount of blank trailer to build up the required diameter. Alternatively, he might use a fixed diameter for all drums 1 and adjust the interlinkage system accordingly.

It will be understood also that numerous suitable circuit arrangements may be employed for the reversal for the motors 4 and 5 upon operation of the limit switch arrangement. Therefore I have shown one such circuit which is illustrative only in a general way. This may comprise, for example, a relay 28 so arranged that it will transfer the power from a conventional power line 29 from one motor to the other in accordance with the aforedescribed behavior of the limit switches. Relay 28 is shown as having a contact-armature 30 adapted to be switched either to the right or to the left to make contact with the contact 31 or the contact 32 by means of the solenoids 33 and 34. As indicated, the solenoid 33 will be energized by means of a battery 35 upon contact between the contacts 7 and 8; while the solenoid 34 will be similarly energized by the bringing together of the contacts 8 and 9. Snap action for the armature 30 may be provided by means of an off-center spring 36 in a well known manner. It will be readily apparent from the circuit that the energization of the solenoid 33 will attract the armature 30 in such manner as to open the circuit of motor 4 and close the circuit of motor 5. Conversely, energization of the solenoid 34 will open the circuit of motor 5 and close that of motor 4. A suitable switch 37 may be provided for opening the circuit from the power line when it is desired to shut down the operation of the entire mechanism. It will be understood, of course, that suitable means may be devised to provide for automatic opening of switch 37 at the end of the rewind if such result be desired. For purposes of simplification such means are, however, not shown.

The roller 38 attached to rotatable arm 39 upwardly biased by spring 40 is merely for the purpose of guiding the film on to drum 2 and tensioning the film to take up slack.

In the Figure 6 there is shown an alternative mechanical arrangement for transferring power between drums. For the purposes of clarity of illustration the detailed arrangements of the motor and the driving systems are omitted and only the essential elements are shown. The wind and rewind system and the interlinkage arrangement of Figure 6 is essentially the same as those in preceding figures. It differs only in that in the place of the contacts 7, 8 and 9 there are substituted plungers 41 and 42 and actuator 43. The actuator 43 corresponding to the contact 8 is affixed to the rod 19 and adapted so that when it reaches the extreme positions of its excursion it will press upon the plungers 41 and 42 to operate the clutch transfer system 44. When the actuator 43 is at the lowermost position of its excursion it will press upon the plunger 42 which thereupon pushes a flexible wire 45 through the hollow core of the tube 46. To the opposite end of the wire 45 is affixed a lever 47 pivoted at 48 and provided with an off-center biasing spring 49. The actuation of this lever by the wire will cause motion of the clutch member 50 to the left to permit the same to engage the driving gear 51. The converse action takes place when the actuator 43 presses upon the plunger 41 which thereby actuates a similar flexible wire member 52 within the tube 53. This thereupon acts to move the clutch member 50 to the right whereupon it engages the gear 54. It will be understood that numerous mechanical arrangements will occur to those skilled in the art which will utilize this action for the transfer of power from one motor to the other.

While I have shown and described a particular embodiment of the invention, it will be understood that numerous modifications thereof will occur to those skilled in the art. All such as fall within the true spirit and scope of my invention, I aim to cover by the appended claims.

I claim:

1. In combination in a machine for winding variable length elongated strips back-and-forth from one roll to another, a first drum and driving means for driving the same to wind a strip thereon, a second drum and driving means for driving the same to wind said strip thereon, a follower system adapted to follow accumulations of said strip on said first drum and to be fixed at a position corresponding to a predetermined approximately maximum extent of said strip thereon and including a first member movable through positions corresponding to the instantaneous amounts of said strip on said first drum, a follower system adapted to follow accumulations of said strip on said second drum for following the instantaneous amounts of said strip thereon and including a second member movable through positions corresponding to the instantaneous amounts of said strip on said second drum, said movable members being movable with respect to each other, a system interconnecting said movable members including means actuated by the motion of said second member to a position corresponding to the accumulation of a predetermined small extent of said strip on said second drum for preventing further motion of said first member, and means on said movable members responsive to further movement of said second member to a position corresponding to the accumulation of a predetermined approximately maximum extent of said strip on said second drum for deenergizing said second driving means and energizing said first driving means, and responsive to movement of said second member to a position corresponding to said predetermined small extent of said strip on said second drum for deenergizing said first and energizing said second driving means.

2. A combination as in claim 1 in which said strips include leader and trailer portions on opposite ends thereof, said means in said interconnecting system being constructed and arranged to fix said first member upon accumulation of a predetermined amount of leader portion on said second drum.

3. A combination as in claim 2 in which said means on said movable members are so positioned as to energize and deenergize said driving means at moments when predetermined lengths of said leader and trailer portions remain on said drums.

4. A combination as in claim 2 in which said means on said movable members are so positioned as to reverse the direction of driving of said drums at moments when predetermined lengths of said leader and trailer portions remain on said drums.

5. A combination as in claim 1 in which said members have associated therewith rollers adapted to ride on the periphery of said rolls, said first member comprises a hollow tube, said second member comprises a rod movable within said tube, and said locking means comprises a dog mechanism biased to engage and lock said tube and adapted to be released from locking engagement by motion of said second member.

6. A combination as in claim 5 in which said deenergizing and energizing means on said movable means comprises mutually contactable members one on each of said members and in contact when said second member is in its position corresponding to the accumulation in said second roll of approximately said predetermined radial accumulation of said strip in said first roll, and mutually contactable members one on said second movable member and one fixed relative thereto and in contact when said second member is in its position corresponding to said predetermined radial accumulation of said strip in said second roll.

7. In combination in a machine for winding radially accumulating rolls of variable length motion picture film strips back-and-forth from one roll to another, a first drum and driving means for driving the same to wind a strip thereon, a second drum and driving means for driving the same to wind said strip thereon, a first roller adapted to follow accumulations of said strip on said first drum and to be locked at a position corresponding to a predetermined approximately maximum radial extent of said strip thereon, a first member connected to said first roller and movable therewith through positions corresponding to the instantaneous radial extents of said strip on said first drum until locked as hereinafter indicated, a second roller adapted to follow accumulations of strip on said second drum for following the instantaneous radial extent of said strip thereon, a second member connected to said second roller and movable therewith through positions corresponding to the instantaneous radial extents of said strip on said second drum, said movable members being movable with respect to each other, a system interconnecting said movable members including locking means actuatable by said second member upon motion of said second roller a predetermined small radial distance away from said second drum for locking said first roller and first member at a position corresponding to said predetermined maximum radial extent of said strip on said first drum, and means on said movable members responsive to movement of said second member to a position corresponding to the accumulation of a predetermined approximately maximum radial extent of said strip on said second drum for deenergizing said second driving means and energizing said first driving means, and responsive to movement of said second member to a position corresponding to said predetermined small radial extent of said strip on said second drum for deenergizing said first and energizing said second driving means.

8. A combination as in claim 7 in which said strips include leader and trailer portions on opposite ends thereof, said means in said interconnecting system being constructed and arranged to lock said first roller and first member upon accumulation of a predetermined radial extent of leader portion on said second drum.

9. A combination as in claim 8, in which said means on said movable members are so positioned as to energize and deenergize said driving means at moments when predetermined lengths of said leader and trailer portions remain on said drums.

10. A combination as in claim 7 in which said first member comprises a hollow tube and said second member is a rod movable within said first member, and said locking means comprises a dog mechanism biased to engage and lock said tube and adapted to be released from locking engagement by motion of said second member.

PERCY E. GREENE.

References Cited in the file of this patent

UNITED STATES PATENTS

| Number | Name | Date |
|---|---|---|
| 1,695,857 | Proctor | Dec. 18, 1928 |

FOREIGN PATENTS

| Number | Country | Date |
|---|---|---|
| 464,943 | Great Britain | Apr. 28, 1937 |